UNITED STATES PATENT OFFICE.

WARD W. ROBINSON, OF EAST LIVERPOOL, OHIO.

AUTOMOBILE-TIRE.

1,333,779. Specification of Letters Patent. Patented Mar. 16, 1920.

Application filed March 14, 1916. Serial No. 84,014.

*To all whom it may concern:*

Be it known that I, WARD W. ROBINSON, a citizen of the United States, residing at East Liverpool, in the county of Columbiana and State of Ohio, have invented a new Automobile-Tire, of which the following is a specification.

My invention relates to improvements in automobile tires in which a partially or completely perforated rubber core cemented to the inner part of the tread of the casing and at the clencher beads, passes longitudinally through the casing. The objects of my improvements are first, to do away with air pressure above that of the atmosphere; second, to decrease the weight of the tire in comparison with a solid tire and at the same time increase the flexibility; third, the variance of the degree of pressure per square inch in accordance with the extent to which the core is perforated; and fourth to increase the mileage of the tire in use.

I attain the foregoing objects by the construction illustrated in the accompanying drawings, in which.

Similar numerals refer to similar parts in the different figures.

Figure 1:
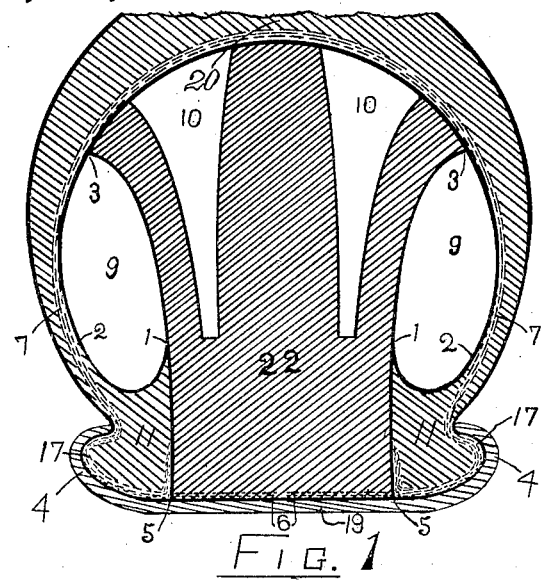
Figure 1 is a transverse section of the tire mounted upon a rim known as the "clencher" type.
Figure 3:
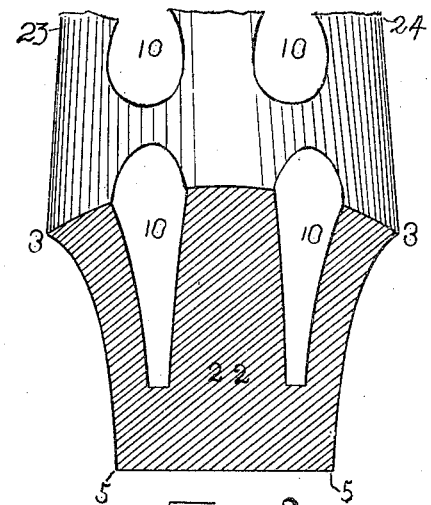
Fig. 3 is a partial top and end view of a section of the core employed.

Fig. 1 is a transverse section of the tire mounted on a rim of the "clencher" type of which 19 is the base of the rim and 4 the inwardly curved flanges, 20 being the casing of the tire, 7 the fabric lining thereof. 11 are beads forming clencher reinforcements, so called on account of the fact that they reinforce the core and help to support the latter. 22 is the core which is provided with conical, pyramidical or frustum shaped holes 10 running from the outer surface 3, 3 toward the base 5, 5. The core extends longitudinally through the casing 20. The core 22 is cemented at its outer surface 3, 3 to the fabric 7 of the inner side or periphery of the tread of the casing 20 and to the clencher reinforcements at the base of the latter.

Figure 2:
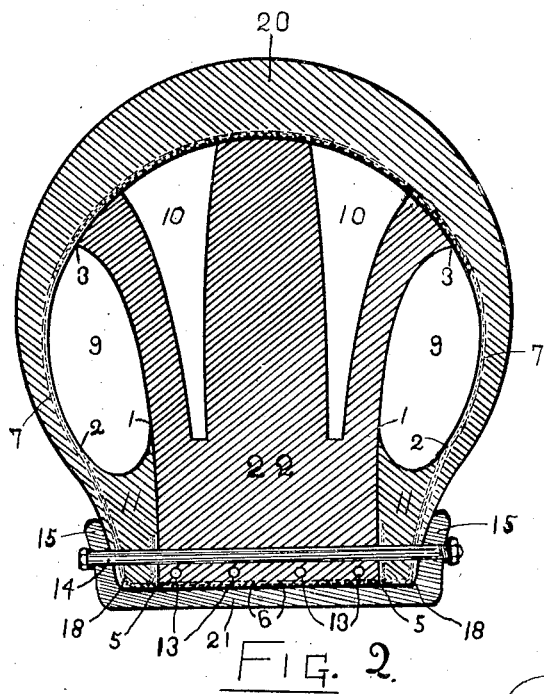
Fig. 2 is also a transverse section of the tire but mounted upon a rim of the "flange" type or a rim having outwardly flaring sides.
Figure 4:
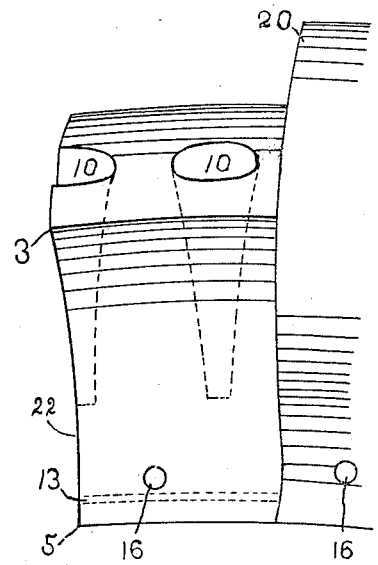
Fig. 4 is a side view of the tire illustrated in Fig. 2, the casing being cut away leaving the core projecting outward.

Fig. 2 is a transverse section of the tire similarly constructed except that the same is mounted on a rim of the "flange" type of which 21 is the base of the rim and 15 the outwardly flaring flanges. When utilizing this form of rim the tire is held thereto by means of bolts 14 passing through the flanges of the rim and the base of the tire, the said bolts being in equal spaced relation to each other around the periphery of the rim. A still further method of securing firmness to the parts is as follows: the tire is held to the rim by means of wires running longitudinally through the base of the tire as indicated at 13. In Fig. 4 is shown the wire 13 and holes 16 through which one of the bolts 14 extends.

I claim:

1. An automobile tire embodying a casing free from air pressure, means to hold the tire casing normally in outstanding position comprising a core formed with conical shaped recesses and having plain side walls at the base thereof, said core extending longitudinally through said casing and being cemented at its outer surface to the fabric of the inner surface of the tread of the casing, said casing provided with elastic reinforcements for the core impinging against opposite walls of the base of the core and cemented to said base of the core.

2. An automobile tire embodying a casing having beads of elastic material forming clencher reinforcements, and a core within the casing, said clencher reinforcements extending outward along the walls of the core and bearing against the latter.

WARD W. ROBINSON.

Witnesses:
H. M. LILLEY,
T. L. FESS.